July 24, 1923.
C. W. PHILIP
INTERNAL COMBUSTION ENGINE AND PARTS THEREOF
Filed Nov. 9, 1921
1,462,654
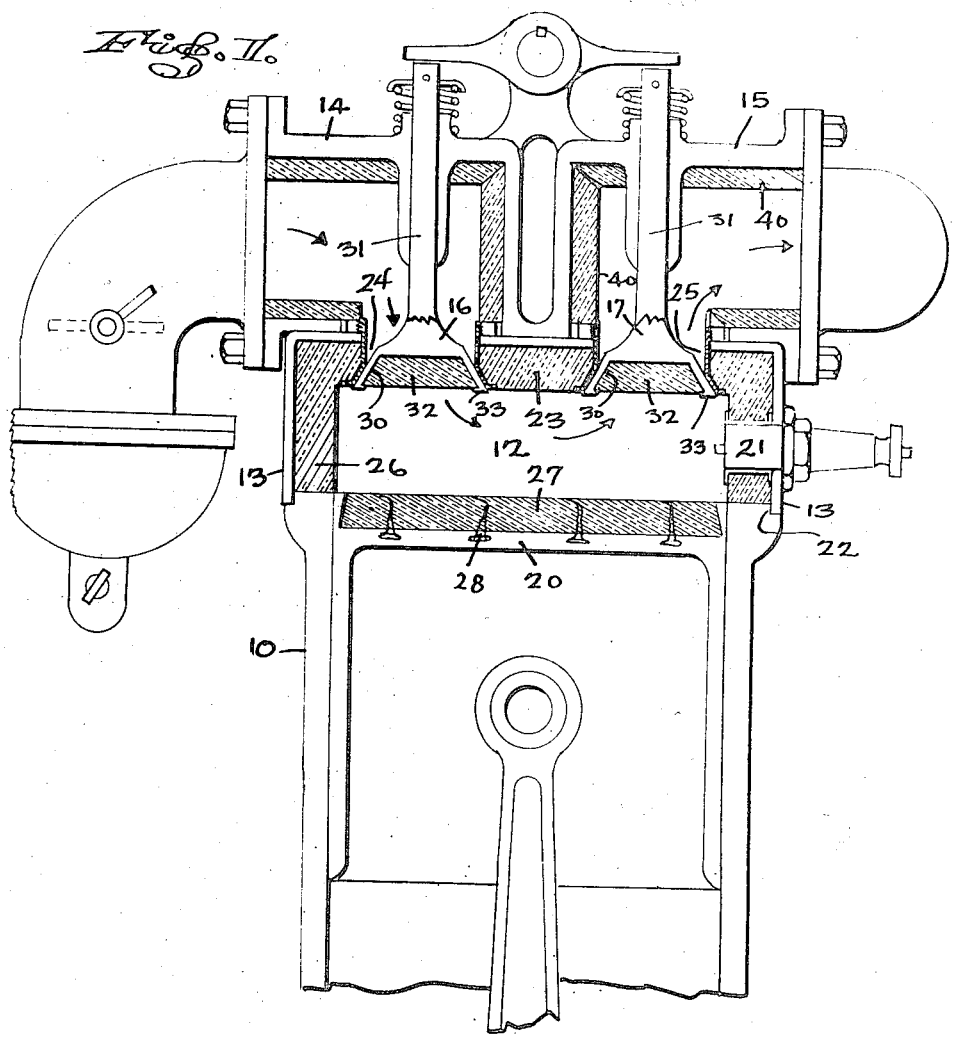
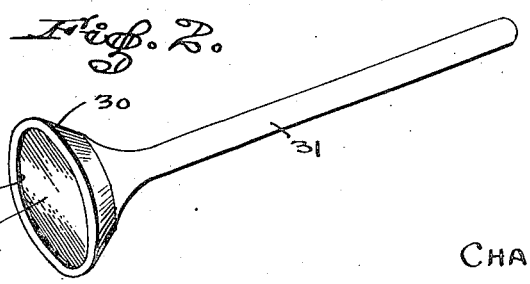
INVENTOR
CHARLES W. PHILIP
BY ATTORNEY
Lincoln Johnson Patented July 24, 1923.

1,462,654

UNITED STATES PATENT OFFICE.

CHARLES W. PHILIP, OF SAN FRANCISCO, CALIFORNIA.

INTERNAL-COMBUSTION ENGINE AND PARTS THEREOF.

Application filed November 9, 1921. Serial No. 513,983.

*To all whom it may concern:*

Be it known that I, CHARLES W. PHILIP, a citizen of the United States, and a resident of the city and county of San Francisco, State of California, have made a new and useful invention—to wit, Improvements in Internal-Combustion Engines and Parts Thereof; and I do hereby declare the following to be a full, clear, concise, and exact description of the same.

This invention relates particularly to an internal combustion engine and means for constructing the same.

The principal object of this invention is to provide an engine wherein the cylinder, adjacent the combustion chamber, the piston, valves and ports will be so constructed and arranged as to prevent the heat of combustion being radiated to the main engine structure.

A further object is to provide a combustion chamber, piston and valves, with insulating material thereon, to prevent the heat of combustion reaching the metallic engine parts, whereby the combustion chamber and attendant parts will be maintained at a lower temperature, the volume of necessary lubricant decreased and to eliminate carbon deposits and consequent foul and dirty parts. A still further object is to provide a valve with the face thereof formed from non-conducting material. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:—

Fig. 1 represents a vertical side elevation through an internal combustion engine constructed in accordance with my invention.

Fig. 2 is a perspective view of my improved valve.

Internal combustion engines utilizing gasified hydro-carbon fuel of a higher gravity for fuel generally consist of a cylinder block 10 formed with a cylindrical chamber 12 therein. The cylinder block has a pressed metal head 13 suitably mounted thereon and adapted to enclose the open end of the chamber 12. A suitable inlet port or manifold 14 secured to said head 13 communicates the atmosphere with the combustion chamber 12 and similarly the exhaust manifold 15 communicates said chamber 12 with the atmosphere. Valves 16 and 17, synchronized to operate in unison with the crank shaft of the engine, are interposed between the respective, inlet and exhaust ports 14 and 15 and chamber 12. The piston 20 is adapted to reciprocate within the cylinder 12 and to draw, to compress, to be reciprocated by expanding gases, and exhaust said gases to make the "suction", "compression", "expansion" and "discharge" cycles in their proper sequence. A suitable sparking means 21 is provided for igniting any gaseous fuel charge admitted through the inlet 14, past the valve 16 into the combustion chamber 12. The construction thus far described is standard in every respect and common to all engines of this type.

In adapting my invention to standard internal combustion conditions, I have milled away the outer upper edge of the cylinder block 10 at 22 to receive the cup shaped head 13. A cup shaped gasket formed from heat resisting and non-conducting material, comprised of the circular base plate 23 and integral flange 26 is adapted to fit within the cup shaped head 13 and the edge of the flange 26 to rest on and engage the top edge of the cylinder block 10. The inner diameter of the gasket flange 26 is the same diameter as the piston and the height of said flange, above the cylinder block 10, forms the combustion chamber. The gasket is also provided with suitable openings, 24 and 25 registering with the inlet and discharge ports 14 and 15, respectively. A smaller opening is provided through which the sparking means 21 may pass.

The piston 20, preferably formed of aluminum, but may be any other metal, is constructed with a depression in its upper face, into which a gasket 27 of the said heat resisting material may be securely locked against dislodgement. The outer diameter of the exposed face of the gasket 27 would be as near the same inner diameter as the combustion chamber, commensurate with good construction. Any number of means might be used for securing the gasket 27 to the face of the piston. In the practice of my invention, I have found it more economical and expedient to place the gasket 27 in the head of a piston mold, (the said gasket being first provided with projecting pins or lugs 28 on one face thereof), so that in pouring molten metal, preferably aluminum, into the mold, it would flow around the said gasket and adhere to it and the projections 28 so as to firmly embed said gasket into the face of the piston. It is to be understood, however, that I do not wish to be confined to this particular method of securing the said gasket to the piston.

The valves, 16 and 17, comprise a hollow cone-shaped casing 30 suitably bevelled exteriorly, according to any predetermined angle, and terminate in a valve stem 31. A suitable filling of the said non-conducting material 32 would be placed within the central cavity of the cone-shaped casing 30 so as to minimize the area of the exposed metallic surface and thereby reducing its powers of heat absorption. The valve is formed by milling the central cavity within the cone-shaped casing and placing therein, a cone-shaped filling 32 of the said heat resisting material. The circumferential edge of the cone-shaped casing 30 would project beyond the exposed face of the gasket material 32 whereby it could be bent or flanged over as at 33, to fixedly lock said gasket 32 within the cavity formed within the cone-shaped casing 30. An insulated valve of this character is especially valuable in an exhaust port which is maintained at a higher temperature than the intake valve, due to the fact that the hot gases pass said valve in being discharged, while the intake valve is cooled by fresh incoming gases.

To further minimize the heat of combustion being transferred or radiated to the metal parts of the engine, I have found it desirable to cover the interior surface of the exhaust manifold 15 with the said heat resisting material 40, whereby the heat of the exhaust gases will not be transmitted to the engine structure adjacent the said exhaust manifold.

I have found it preferable to form the insulating gaskets 23, 27, 32 and 40 from fibrous asbestos, compressed under a pressure of about 7,000 tons per square inch. The material is thus united into a hard mass having all the physical properties of metal, but with a body texture able to withstand the destructive effects of combustion, the heat of the exploded gases and at the same time prevent said heat being transmitted to the exposed portions of the combustion chamber, piston and valves and burning or breaking up the lubricating properties of the lubricating oil. The vaporous nature of the fuel used, also tends to keep the various gaskets sufficiently moist so as to eliminate the possibilities of said gasket material drying up and disintegrating.

Actual experiments have proven that a combustion chamber formed with non-conducting material placed upon the piston, valves and cylinder wall prevents carbon deposits from collecting on the protected parts, inasmuch as the said walls do not become heated to the point where carbon will collect. In the usual all metal combustion chamber the same becomes heated to approximately the heat of combustion, so that the fuel gas in striking this heated surface becomes broken down or disintegrated and adheres to the portions with which it comes in contact. After an initial deposit has been made the waste hydro-carbon particles remaining after combustion readily collect and form a dirty and foul combustion chamber, resulting in premature combustion and a reduction of efficiency.

With an engine structure constructed according to my invention, cylinder block, cylinder head and piston are kept at a very low temperature, preventing the wasted products of combustion from collecting, eliminating any change of premature firing, and making each particular combustion clean and efficient and further preventing the radiated heat of the engine wall structure from being transmitted to the lubricating compound and destroying the body thereof.

Having thus described my invention what I claim and desire to secure by Letters Patent is:—

1. In an engine of the type set forth, a piston having a closed end with an outwardly extending shoulder formed with an inner face the walls of which converge outwardly, heat-resisting non-conducting material covering the outer face of the closed end of the piston and conformably engaged with the converging walls of the shoulder, said shoulder being integral with the piston and having its said walls of such inclination as to hold the said material in position by frictional engagement therewith and means embedded in the non-conducting material and in the piston to connect the central part of the non-conducting material to the piston.

2. In an engine of the type set forth, a piston having a closed end with an outwardly extending shoulder formed with an inner face the walls of which converge outwardly, and heat-resisting non-conducting material covering the outer face of the closed end of the piston and conformably engaged with the converging walls of the shoulder, said shoulder being integral with the piston and having its said walls of such inclination as to hold the said material in position by frictional engagement therewith, said material having pins which project outwardly from the inner face thereof and are interlockingly embedded in the material of the piston.

3. In combination with an engine such as described, of a piston arranged to be reciprocated in said engine, said piston having heat-resisting, non-conducting material covering the exposed end thereof within said engine; and metal pins in said material adapted to be embedded in said piston end to form a homogeneous union.

4. In combination with an engine such as described, of a piston arranged to be reciprocated in said engine; an integral annular shoulder formed on the exposed end of the said piston within said engine; heat-resisting, non-conducting material adapted to cover the exposed end of said piston within said annular shoulder; and metal pins in said material adapted to be embedded in said piston end to form a homogeneous union therewith.

In testimony whereof, I have hereunto set my hand at San Francisco, California, this 29th day of October, 1921.

CHARLES W. PHILIP.

In presence of—

LINCOLN V. JOHNSON.